(12) United States Patent
Becene et al.

(10) Patent No.: US 11,274,886 B2
(45) Date of Patent: Mar. 15, 2022

(54) HEAT EXCHANGER HEADER WITH FRACTAL GEOMETRY

(71) Applicant: Hamilton Sundstrand Corporation, Charlotte, NC (US)

(72) Inventors: Ahmet T. Becene, West Simsbury, CT (US); Gabriel Ruiz, Granby, CT (US); Feng Feng, South Windsor, CT (US); Michael Maynard, Springfield, MA (US); Michael Doe, Southwick, MA (US); Michele Hu, Manchester, CT (US); Ephraim Joseph, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 86 days.

(21) Appl. No.: 16/711,140

(22) Filed: Dec. 11, 2019

(65) Prior Publication Data
US 2020/0284532 A1    Sep. 10, 2020

Related U.S. Application Data

(60) Provisional application No. 62/815,831, filed on Mar. 8, 2019.

(51) Int. Cl.
*F28F 9/02* (2006.01)
*F28D 1/047* (2006.01)
(Continued)

(52) U.S. Cl.
CPC .......... *F28F 9/0275* (2013.01); *F28D 1/0472* (2013.01); *F28D 7/024* (2013.01); *F28D 2021/0026* (2013.01); *F28F 2210/02* (2013.01)

(58) Field of Classification Search
CPC ...... F28F 9/0275; F28D 1/0472; F28D 7/024; F28D 2021/0026
See application file for complete search history.

(56) References Cited

U.S. PATENT DOCUMENTS 485,315 A * 11/1892 Yaryan ................ B01D 1/0094
159/26.1
1,768,222 A    6/1930 Uhde
(Continued)

FOREIGN PATENT DOCUMENTS

DE    202019102083 U1    4/2019
EP    0074570 A2    3/1983
(Continued)

OTHER PUBLICATIONS

Communication Pursuant to Article 94(3) EPC for EP Application No. 19216221.2, dated Oct. 27, 2021, 6 pages.
(Continued)

*Primary Examiner* — Jon T. Schermerhorn, Jr.
(74) *Attorney, Agent, or Firm* — Kinney & Lange, P.A.

(57) ABSTRACT

A heat exchanger header for receiving a first fluid includes a tubular primary fluid channel oriented along a first axis and having a first cross-sectional area. A first branched region adjacent to the primary fluid channel fluidly connects to a plurality of tubular secondary fluid channels, each having a second cross-sectional area, and a second branched region adjacent to each of the secondary fluid channels fluidly connects to a plurality of tubular tertiary fluid channels, each having a third cross-sectional area. The second cross-sectional area is greater than the third cross-sectional area.

16 Claims, 3 Drawing Sheets

(51) Int. Cl.
*F28D 7/02* (2006.01)
*F28D 21/00* (2006.01)

(56) References Cited

U.S. PATENT DOCUMENTS

| | | | |
|---|---|---|---|
| 2,734,224 A * | 2/1956 | Winstead | B29C 48/08 |
| | | | 425/190 |
| 3,212,570 A | 10/1965 | Holman | |
| 4,058,161 A | 11/1977 | Trepaud | |
| 4,451,960 A | 6/1984 | Molitor | |
| 4,570,703 A | 2/1986 | Ringsmuth et al. | |
| 5,388,635 A | 2/1995 | Gruber et al. | |
| 6,296,020 B1 | 10/2001 | McNeely et al. | |
| 6,688,381 B2 * | 2/2004 | Pence | B01F 5/06 |
| | | | 165/139 |
| 7,240,723 B2 | 7/2007 | Wu et al. | |
| 8,241,239 B2 | 8/2012 | Solomon et al. | |
| 8,528,628 B2 | 9/2013 | Robinson | |
| 9,134,072 B2 * | 9/2015 | Roisin | F28D 7/0041 |
| 9,541,331 B2 * | 1/2017 | Nagurny | F28D 7/024 |
| 9,656,212 B2 * | 5/2017 | DiBiasio | B01L 3/502746 |
| 9,964,077 B2 | 5/2018 | Neal et al. | |
| 9,976,815 B1 | 5/2018 | Roper et al. | |
| 10,048,019 B2 | 8/2018 | Karlen et al. | |
| 10,088,250 B2 | 10/2018 | Turney | |
| 10,267,515 B2 | 4/2019 | Adriany et al. | |
| 10,684,080 B2 | 6/2020 | Moore et al. | |
| 11,168,942 B2 * | 11/2021 | Becene | F28D 1/0233 |
| 2003/0039169 A1 | 2/2003 | Ehrfeld et al. | |
| 2004/0195708 A1 | 10/2004 | Lavemann et al. | |
| 2008/0190586 A1 | 8/2008 | Robinson | |
| 2009/0269837 A1 | 10/2009 | Shevkoplyas et al. | |
| 2009/0274549 A1 | 11/2009 | Mitchell et al. | |
| 2009/0316972 A1 | 12/2009 | Borenstein et al. | |
| 2010/0297535 A1 | 11/2010 | Das et al. | |
| 2012/0125560 A1 | 5/2012 | McKeown et al. | |
| 2013/0206374 A1 | 8/2013 | Roisin et al. | |
| 2014/0262136 A1 | 9/2014 | Jensen | |
| 2015/0140190 A1 | 5/2015 | Cully et al. | |
| 2016/0116218 A1 | 4/2016 | Shedd et al. | |
| 2017/0089643 A1 | 3/2017 | Arafat | |
| 2017/0191762 A1 | 7/2017 | Duelser et al. | |
| 2017/0205149 A1 | 7/2017 | Herring et al. | |
| 2017/0248372 A1 | 8/2017 | Erno et al. | |
| 2017/0328644 A1 * | 11/2017 | Takahashi | F28F 9/22 |
| 2018/0038654 A1 | 2/2018 | Popp et al. | |
| 2018/0051934 A1 | 2/2018 | Wentland et al. | |
| 2018/0100703 A1 | 4/2018 | Beaver et al. | |
| 2018/0100704 A1 | 4/2018 | Lewandowski et al. | |
| 2018/0266770 A1 | 9/2018 | Wagner et al. | |
| 2018/0283794 A1 | 10/2018 | Cerny et al. | |
| 2018/0283795 A1 | 10/2018 | Cerny et al. | |
| 2019/0024989 A1 | 1/2019 | Wilson et al. | |
| 2019/0086154 A1 | 3/2019 | Adriany et al. | |
| 2019/0366290 A1 | 12/2019 | Hofmann et al. | |
| 2020/0041212 A1 * | 2/2020 | Palmer | F28D 7/1607 |

FOREIGN PATENT DOCUMENTS

| | | |
|---|---|---|
| EP | 3124906 A1 | 2/2017 |
| EP | 3410054 A1 | 12/2018 |
| FR | 453494 A | 6/1913 |
| GB | 588520 A | 5/1947 |
| JP | 2006322643 A | 11/2006 |
| WO | WO2010138061 A1 | 12/2010 |
| WO | WO2017052798 A1 | 3/2017 |
| WO | WO2018154063 A1 | 8/2018 |
| WO | 2018191787 A1 | 10/2018 |
| WO | WO2018182808 A1 | 10/2018 |

OTHER PUBLICATIONS

Extended European Search Report for EP Application No. 21176197.8, dated Nov. 9, 2021, 8 pages.
L. Luo et al., "Integration of Constructal Distributors to a Mini Crossflow Heat Exchanger and Their Assembly Configuration Optimization", from Chemical Engineering Science 62, (2007) pp. 3605-3619.
L. Luo et al., Experimental Study of Constructal Distributor for Flow Equidistribution in a Mini Crossflow Heat Exchanger (MCHE), from Chemical Engineering and Processing 47, (2008) pp. 229-236.
Z. Fan, et al., "Numerical Investigation of Constructal Distributors with Different Configurations", from Chinese Journal of Chemical Engineering, 17(1), (2009) pp. 175-178.
Extended European Search Report for EP Application No. 19216221.2, dated Jul. 28, 2020, 7 pages.
Extended European Search Report for EP Application No. 19216146.1, dated Jul. 2, 2020, 8 pages.
Extended European Search Report for EP Application No. 19216295.6, dated Jul. 22, 2020, 7 pages.
Extended European Search Report for EP Application No. 19215931.7, dated Jul. 28, 2020, 8 pages.
Extended European Search Report for EP Application No. 19213258.7, dated May 8, 2020, 9 pages.
L. Luo, et al., "Constructal approach and multi-scale components" from Applied Thermal Engineering 27 (2007) pp. 1708-1714.

* cited by examiner

HEAT EXCHANGER HEADER WITH FRACTAL GEOMETRY

CROSS-REFERENCE TO RELATED APPLICATION(S)

This application claims the benefit of U.S. Provisional Application No. 62/815,831 filed Mar. 8, 2019 for "HEAT EXCHANGER HEADER WITH FRACTAL GEOMETRY" by A. Becene, G. Ruiz, F. Feng, M. Maynard, M. Doe, M. Hu, and E. Joseph.

BACKGROUND

Many aircraft heat exchangers operate at high temperatures and are subject to thermal stresses caused by thermal expansion, especially with thermal coefficient mismatch and uneven temperature distribution within the heat exchanger or with abutting components. These thermal stresses can lead to a reduction in the service life of the heat exchanger. In addition, deleterious mechanical stresses due to vibration can arise where components' natural frequencies coincide significantly with engine operating frequencies. Particularly high stress regions within aircraft heat exchangers include interfaces between fluid inlets and outlets with the core section.

SUMMARY

A heat exchanger header for receiving a first fluid includes a tubular primary fluid channel oriented along a first axis and having a first cross-sectional area. A first branched region adjacent to the primary fluid channel fluidly connects to a plurality of tubular secondary fluid channels, each having a second cross-sectional area, and a second branched region adjacent to each of the secondary fluid channels fluidly connects to a plurality of tubular tertiary fluid channels, each having a third cross-sectional area. The second cross-sectional area is greater than the third cross-sectional area.

A heat exchanger includes an inlet header for receiving a first fluid, and an outlet header in fluid communication with the inlet header. The inlet header includes a tubular primary fluid channel oriented along a first axis and having a first cross-sectional area. A first branched region downstream of and adjacent to the primary fluid channel fluidly connects to a plurality of tubular secondary fluid channels, each having a second cross-sectional area, and a second branched region downstream of and adjacent to each of the secondary fluid channels fluidly connects to a plurality of tubular tertiary fluid channels, each having a third cross-sectional area. The outlet header similarly includes a tubular primary fluid channel oriented along a first axis and having a first cross-sectional area. A first branched region upstream of and adjacent to the primary fluid channel fluidly connects to a plurality of tubular secondary fluid channels, each having a second cross-sectional area, and a second branched region upstream of and adjacent to each of the secondary fluid channels fluidly connects to a plurality of tubular tertiary fluid channels, each having a third cross-sectional area. Each of the second cross-sectional areas are greater than each of the third cross-sectional areas.

DETAILED DESCRIPTION

A heat exchanger with improved performance under thermal and vibrational stresses is disclosed herein. The heat exchanger includes branched tubular inlet and outlet headers with a fractal branching pattern to give the heat exchanger improved thermal and mechanical properties. In one embodiment, the individual tubular flow paths can be relatively straight, while in another embodiment, the tubular flow paths can be helical. The headers can be additively manufactured to achieve varied tubular dimensions (e.g., cross-sectional area, wall thicknesses, curvature, etc.), and can be mated with traditional core sections (e.g., plate-fin) or with more complex, additively manufactured core sections.

Figure 1:
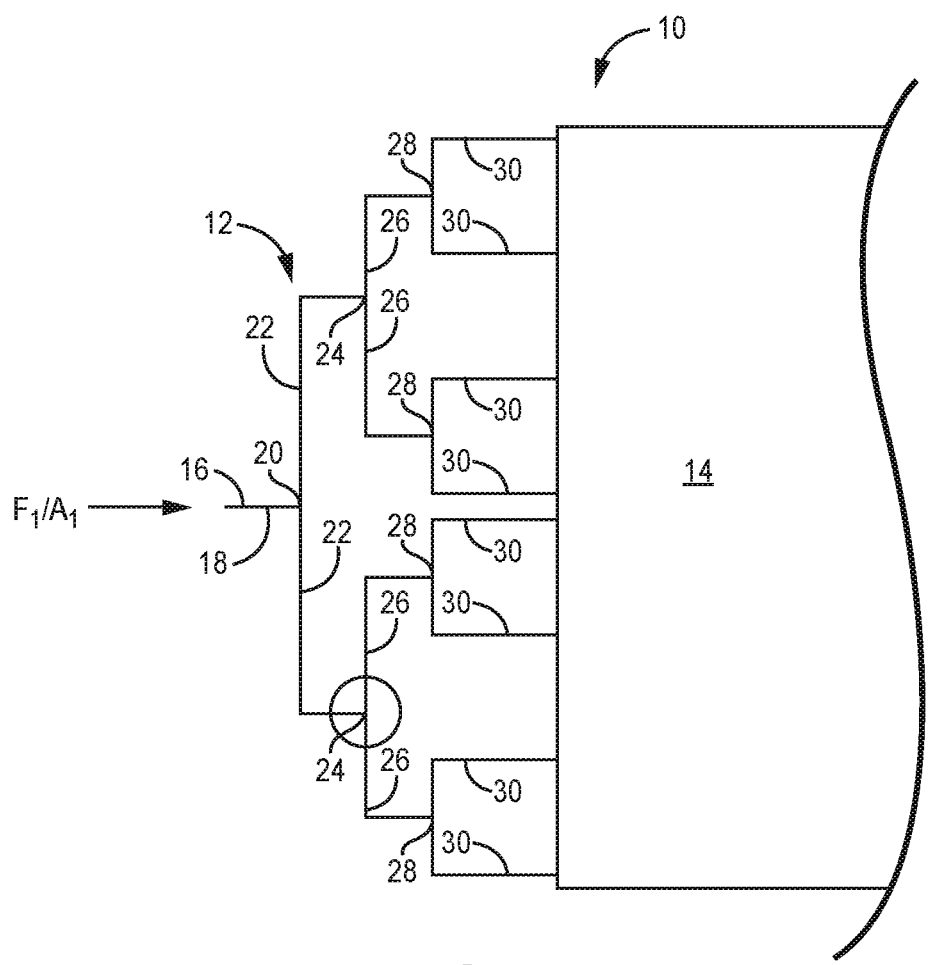
FIG. 1 is a partial schematic view of heat exchanger with a branched header.

FIG. 1 is a partial schematic view of heat exchanger 10 having a branched header 12 fluidly connected to core 14. In the embodiment shown, header 12 is an inlet header such that it can receive a first fluid $F_1$ at fluid inlet 16. In operation, first fluid $F_1$ flows through inlet header 12 and core 14 along a first flow axis $A_1$ and exits through an outlet header (shown in FIG. 4) fluidly connected to core 14 on a side opposite inlet header 12. In an alternative embodiment, the direction of flow of first fluid $F_1$ can be reversed such that header 12 is an outlet header with a fluid outlet 16. Further, heat exchanger 10 can be arranged to receive a second fluid $F_2$ (not labeled in the figures) at core 14 along an axis perpendicular to axis $A_1$ (i.e., a cross-flow arrangement), or to receive second fluid $F_2$ along an axis parallel to axis $A_1$ in an opposite flow direction (i.e., a counter-flow arrangement). First fluid $F_1$ can be a relatively hot fluid having a higher temperature than second fluid $F_2$, which can be a relatively cool fluid, but the designations can be reversed in alternative embodiments.

Header 12 includes primary fluid channel 18 downstream (based on the direction of flow of fluid $F_1$ shown in FIG. 1) of inlet 16. A first branched region 20 is disposed downstream of primary fluid channel 18 and allows a portion of first fluid $F_1$ to flow into secondary fluid channels 22. Each of the secondary fluid channels 22 fluidly connects to a downstream second branched region 24, and each of the second branched regions 24 connects to a plurality of tertiary fluid channels 26. Each tertiary fluid channel 26 connects to a downstream third branched region 28, and each third branched region 28 connects to a plurality of quaternary fluid channels 30. Header 12, as shown, includes three branching stages stemming from primary fluid channel 18, but alternative embodiments can include fewer branched regions, or additional branched regions, resulting in, respectively, a reduction or increase in serially-arranged fluid channels. Further, the branched regions, as shown, are bifurcations, such that each splits into a pair of child fluid channels. Alternative embodiments can, however, include branched regions that subdivide into greater than two child fluid channels, based upon such factors as spatial constraints and/or desired flow characteristics, to name a few non-limiting examples.

Figure 2:
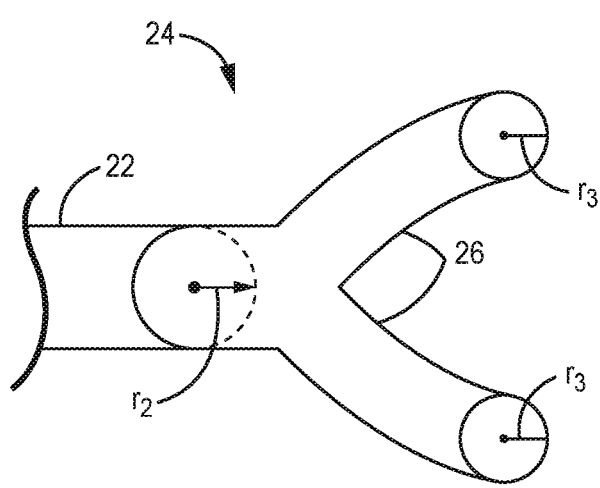
FIG. 2 is an enlarged view of a branched region of the header of FIG. 1.

FIG. 2 is an enlarged view of a section of header 12 proximate second branched region 24 showing a representative geometry of the branched region and associated fluid channels. In the embodiment of FIG. 2, secondary fluid channel 22 and each tertiary fluid channel 26 are tubular (i.e., hollow with at least some rounded portions) channels having a generally circular cross-section. As shown, secondary fluid channel 22 has a radius $r_2$ with a corresponding cross-sectional area defined by $A=\pi r_2^2$. Similarly, each of the tertiary fluid channels 26 has a radius $r_3$ and a corresponding area defined by $A=\pi r_3^2$. An alternative embodiment can include tubular fluid channels with one or a combination of other cross-sectional shapes, such as elliptical, oval, or shapes having rounded and/or relatively straight edges. In such cases, cross-sectional area of a particular fluid channel can be determined using the appropriate equation. For example, the cross-sectional area of an elliptical fluid channel can be determined by $A=\pi ab$, where a and b are the major and minor axes, respectively, of the ellipse.

With continued reference to FIGS. 1 and 2, branching of header 12 can, in some embodiments, be based upon Murray's law, which predicts the diameter of each stage of a fluid transport network for minimization of the energy cost of transport and maintenance of the transport medium. According to Murray's law, the relationship between a parent branch and a child branch is such that $r_p > r_d$ (where subscript p denotes the parent and d the child), and the relationship between a parent branch and all resulting child branches is $r_p^x = \sum_{i=1}^{N} r_{di}^x$, where x can, for example, be generally equal to 3. For example, in the embodiment of FIGS. 1 and 2, radius $r_2$ can be greater than radius $r_3$, and x can be equal to 3 (or approximately 3) such that the relationship between secondary fluid channel 22 and tertiary fluid channels 26 follows the equation $r_2^3 = \Sigma r_3^3$. The other parent-child fluid stages of header 12 can have a similar relationship. For example, although not depicted, primary fluid channel can have a radius $r_1$ that is greater than radius $r_2$, where $r_1^3 = \Sigma r_2^3$, and each of the quaternary fluid channels can have a radius $r_4$ that is less than radius $r_3$, where $r_3^3 = r_4^3$. The degree of adherence to Murray's law can vary from embodiment to embodiment such that x can fall within a range of approximately 1 to 3.5 or more, depending on fluid velocity, temperature, density, and tube size to name a few, non-limiting examples. Other factors related to header geometry, heat transfer requirements, and/or those affecting the degree of mass-conservation of a particular embodiment are also contemplated herein. Accordingly, one or more other controlling equations/principles related to fluid systems can additionally or alternatively be applied to the design of header 12.

Figure 3:
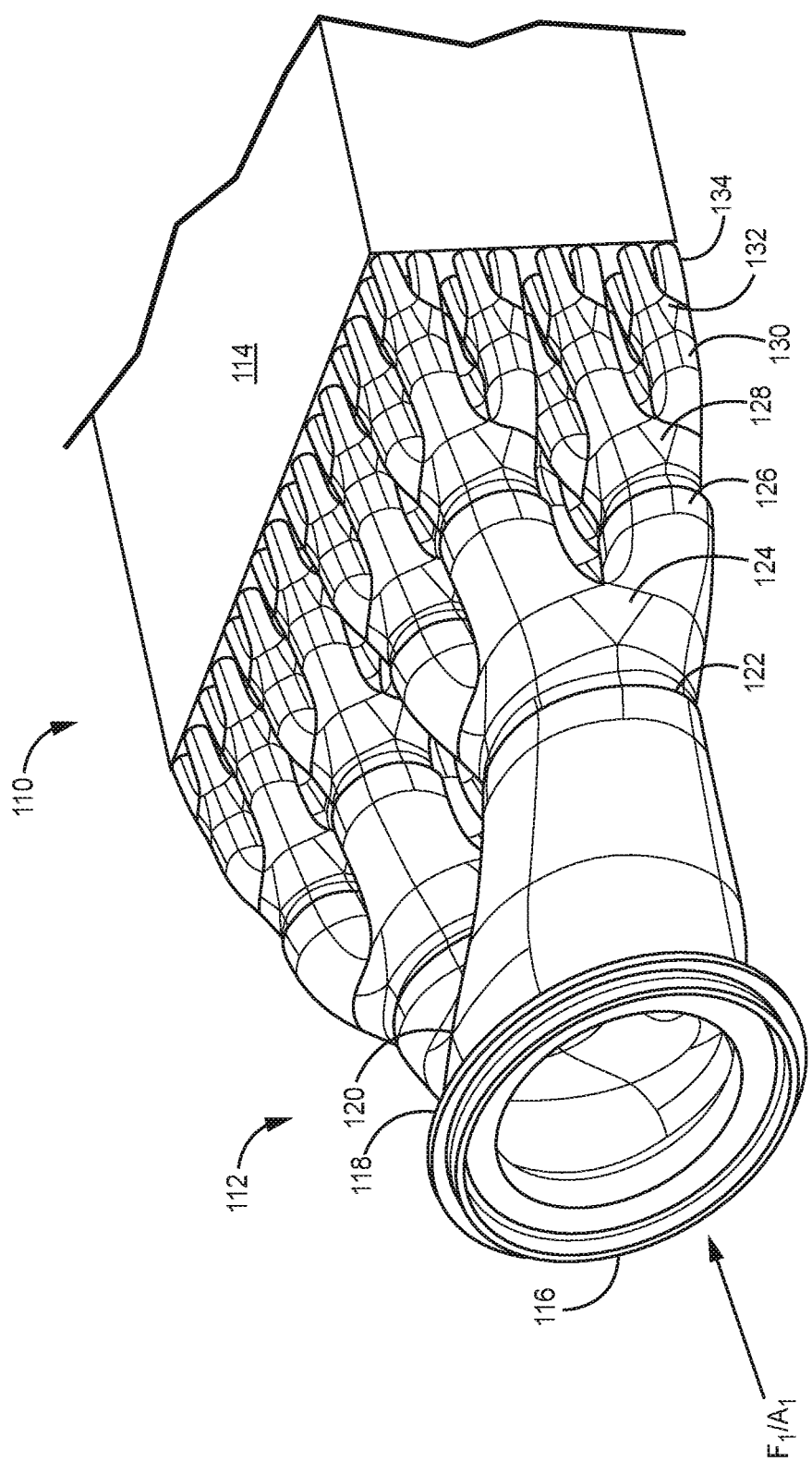
FIG. 3 is a perspective view of an embodiment of the heat exchanger of FIG. 1 having a straight tube header configuration.

An embodiment of heat exchanger 10 is shown in FIG. 3. Heat exchanger 110 includes a core 114 fluidly connected to header 112, which is shown as an inlet header based on the direction of flow of first fluid $F_1$, but can be an outlet header in an alternative embodiment. Header 112 has relatively straight tubes collectively giving header 112 a rectangular shape and includes fluid inlet 116 to receive first fluid $F_1$. Header 112 is substantially similar to header 12 of FIGS. 1 and 2 such that each of fluid inlet 116e is serially connected to a primary fluid passage 118, a first branched region 120, secondary fluid passages 122, second branched regions 124, tertiary fluid channels 126, third branched regions 128, and quaternary fluid channels 130. Header 112 further includes fourth branched regions 132 and quinary fluid channels 134. In the embodiment shown, header 112 fluidly connects to core 114 downstream of quinary fluid channels 136. Core 114 is shown with a rectangular geometry, such as a plate-fin heat exchanger, but alternative embodiments can include other core types and/or geometries.

Figure 4:
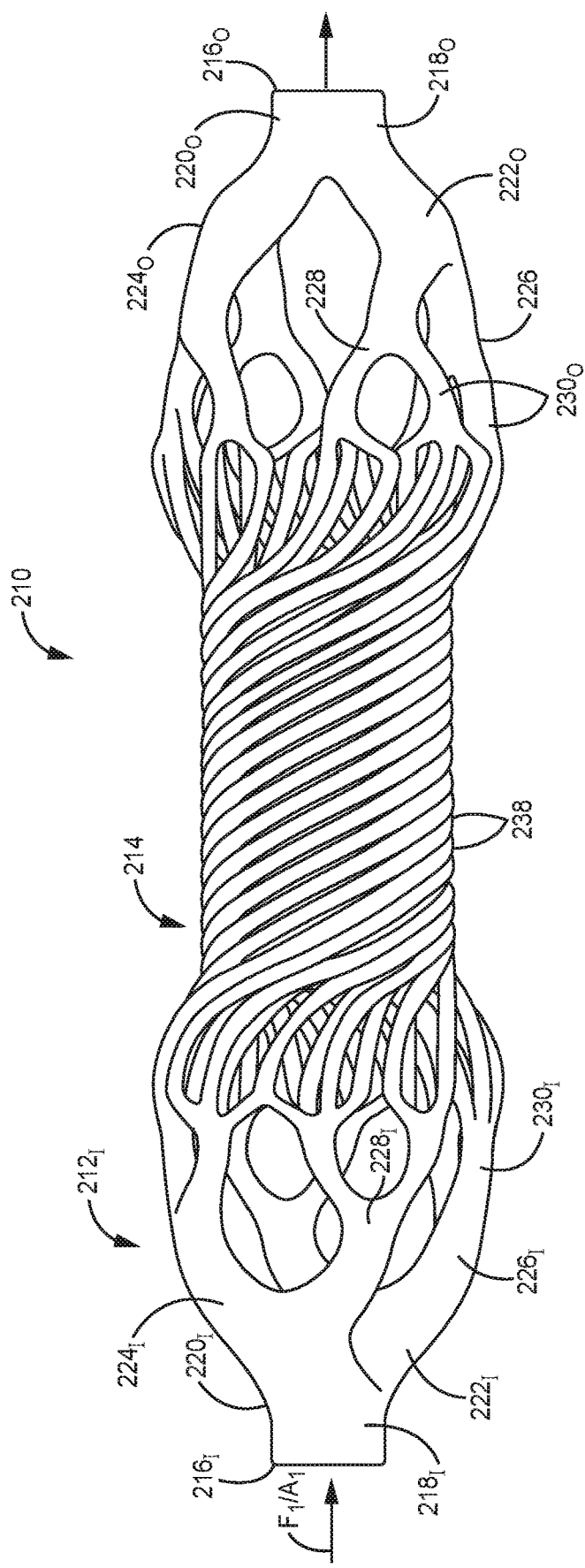
FIG. 4 is a perspective view of an alternative embodiment of the heat exchanger of FIG. 1 having a helical tube header configuration.

An alternative embodiment of heat exchanger 10 is shown in FIG. 4. Heat exchanger 210, is substantially similar to heat exchangers 10 and 110, and includes a core 214 disposed between and fluidly connected to inlet header $212_I$ and outlet header $212_O$. Fluid inlet $216_I$ to receive first fluid $F_1$ and outlet header $212_O$ includes fluid outlet $216_O$ through which first fluid $F_1$ can exit the heat exchanger. In serial fluid communication with each of fluid inlet $216_I$ and fluid outlet $216_O$ (denoted in FIG. 4 with the applicable "I" or "O" subscript, but generally referred to herein solely by reference number) are primary fluid passage 218, first branched region 220, secondary fluid passages 222, second branched regions 224, tertiary fluid channels 226, third branched regions 228, and quaternary fluid channels 230. Quaternary fluid channels 230 fluidly connect to tubular core fluid channels 238, which, are arranged to form a helical core 214. As with the other heat exchanger embodiments described herein, alternative core geometries can be used.

The branched configuration of headers 12, 112, and 212 provides increased heat transfer at the headers over traditional boxy designs, which can allow for the use of a smaller core 114, thus saving both space and weight. Further, the graduation of tube radii of the fluid channels helps alleviate turbulent flow and fluid stagnation in the headers, thus reducing pressure drop across the heat exchanger. The branching and tubular structure of the various fluid channels provides increased compliance (i.e., reduced stiffness) in various directions, allowing for reduced thermal stresses of the header as a whole. More specifically, the tubular fluid channels of the straight header configuration (FIG. 3) act as a slim beam with reduced stiffness, while the tubular fluid channels of the helical header configuration (FIG. 4) act as a combination of a beam and a spring, with reduced radial and longitudinal stiffness. Requisite stiffness can, however, be achieved, for example, by tailoring wall thicknesses of the tubular fluid channels, or by selecting certain geometric shapes (e.g., curved) in a desired dimension. This can drive the natural vibrational modes of the core along this dimension out of (lower) frequency bands corresponding to engine operating frequencies. With respect to fluid flow, the straight tube configuration can favor a more laminar flow due to the relatively straight fluid channels, while the helical tube configuration can favor increased heat transfer due to the ability to generate some turbulent flow through the helical fluid channels, as well as greater heat transfer area created by the increased distance between two points along the helical fluid channel.

The headers and/or cores of heat exchangers 10, 110, and 210 can be formed partially or entirely by additive manufacturing. For metal components (e.g., Inconel, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining unique geometries and for reducing the need for welds or other attachments (e.g., between a header and core). However, other suitable manufacturing process can be used. For example, header and core elements can in some embodiments be fabricated separately and joined via later manufacturing steps.

The disclosed heat exchanger headers offer improved thermal and mechanical properties. The branching configuration reduces pressure drop across the header and allows for increased thermal transfer. The straight and helical tubular fluid channels give the headers increased compliance for reduced thermal stresses and can be further tailored to introduce stiffness in certain dimensions for reduced mechanical stresses. In addition to aerospace applications, the disclosed headers can be used generally in other transportation industries, as well as industrial applications.

Discussion of Possible Embodiments

The following are non-exclusive descriptions of possible embodiments of the present invention.

A heat exchanger header for receiving a first fluid includes a tubular primary fluid channel oriented along a first axis and having a first cross-sectional area. A first branched region adjacent to the primary fluid channel fluidly connects to a plurality of tubular secondary fluid channels, each having a second cross-sectional area, and a second branched region adjacent to each of the secondary fluid channels fluidly connects to a plurality of tubular tertiary fluid channels, each having a third cross-sectional area. The second cross-sectional area is greater than the third cross-sectional area.

The header of the preceding paragraph can optionally include, additionally and/or alternatively, any one or more of the following features, configurations and/or additional components:

In the above header, the secondary fluid channels and the tertiary fluid channels can have one of a straight geometry and a helical geometry.

In any of the above headers, the header can have a fractal geometry.

In any of the above headers, the first branched region can be a bifurcation, such that the plurality of secondary fluid channels comprises a pair, and the second branched region can be a bifurcation, such that the plurality of tertiary fluid channels comprises a pair.

In any of the above headers, the header can be formed from a metallic or a polymer material.

In any of the above headers, the first cross-sectional area can be defined by a first radius ($r_1$), the second cross-sectional area can be defined by a second radius ($r_2$), and the third cross-sectional area can be defined by a third radius ($r_3$).

In any of the above headers, the relationship between the primary fluid channel and each of the secondary fluid channels can follow the equation $r_1^x = \Sigma r_2^x$ where x falls within the range of 1.5 to 3.5, and the relationship between each of the secondary fluid channels and each of the tertiary fluid channels can follow the equation $r_1^x = \Sigma r_2^x$ where x falls within the range of 1.5 to 3.5.

Any of the above headers can further include a third branched region adjacent to each of the tertiary fluid channels, each of the third branched regions fluidly connected to a plurality of tubular quaternary fluid channels, each having a fourth cross-sectional area.

In any of the above headers, the fourth cross-sectional area can be defined by a fourth radius ($r_4$), and the relationship between each of the tertiary fluid channels and each of the quaternary fluid channels can follow the equation $r_3^x = \Sigma r_4^x$ where x falls within the range of 1.5 to 3.5.

In any of the above headers, for each of the equations $r_1^x = \Sigma r_2^x$ and $r_2^x = \Sigma r_3^x$, x can be equal to 3.

A heat exchanger includes an inlet header for receiving a first fluid, and an outlet header in fluid communication with the inlet header. The inlet header includes a tubular primary fluid channel oriented along a first axis and having a first cross-sectional area. A first branched region downstream of and adjacent to the primary fluid channel fluidly connects to a plurality of tubular secondary fluid channels, each having a second cross-sectional area, and a second branched region downstream of and adjacent to each of the secondary fluid channels fluidly connects to a plurality of tubular tertiary fluid channels, each having a third cross-sectional area. The outlet header similarly includes a tubular primary fluid channel oriented along a first axis and having a first cross-sectional area. A first branched region upstream of and adjacent to the primary fluid channel fluidly connects to a plurality of tubular secondary fluid channels, each having a second cross-sectional area, and a second branched region upstream of and adjacent to each of the secondary fluid channels fluidly connects to a plurality of tubular tertiary fluid channels, each having a third cross-sectional area. Each of the second cross-sectional areas are greater than each of the third cross-sectional areas.

The heat exchanger of the preceding paragraph can optionally include, additionally and/or alternatively, any one or more of the following features, configurations and/or additional components:

In the above heat exchanger, one of the inlet header secondary and tertiary fluid channels, and the outlet header secondary and tertiary fluid channels can have a straight geometry.

In any of the above heat exchangers, one of the inlet header secondary and tertiary fluid channels, and the outlet header secondary and tertiary fluid channels can have a helical geometry.

In any of the above heat exchangers, the first branched region can be a bifurcation, such that the plurality of secondary fluid channels comprises a pair, and the second branched region can be a bifurcation, such that the plurality of tertiary fluid channels comprises a pair.

Any of the above heat exchangers can further include a core section disposed between and fluidly connecting the inlet header and the outlet header.

In any of the above heat exchangers, at least one of the inlet header and the outlet header can have a fractal geometry.

In any of the above heat exchangers, each of the first cross-sectional areas can be defined by a first radius ($r_1$), each of the second cross-sectional areas can be defined by a second radius ($r_2$), and each of the third cross-sectional areas can be defined by a third radius ($r_3$).

In any of the above heat exchangers, the relationship between the inlet header and outlet header primary fluid channels and each of the inlet header and outlet header secondary fluid channels can follow the equation $r_1^x = \Sigma r_2^x$ where x falls within the range of 1.5 to 3.5, and the relationship between each of the inlet header and outlet header secondary channels and each of the inlet header and outlet header tertiary fluid channels can follow the equation $r_2^x = \Sigma r_3^x$ where x falls within the range of 1.5 to 3.5.

Any of the above heat exchangers can further include an inlet header third branched region adjacent to each of the inlet header tertiary fluid channels, each of the third branched regions being fluidly connected to a plurality of tubular quaternary fluid channels, each having a fourth cross-sectional area, and an outlet header third branched region adjacent to each of the outlet header tertiary fluid channels, each of the third branched regions being fluidly connected to a plurality of tubular quaternary fluid channels, each having a fourth cross-sectional area.

In any of the above heat exchangers, for each of the equations $r_1^x = \Sigma r_2^x$ and $r_2^x = \Sigma r_3^x$, x can be equal to 3.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger header configured to receive a first fluid, the header comprising:
   a tubular primary fluid channel oriented along a first axis and having a first cross-sectional area;
   a first branched region adjacent to the primary fluid channel, the first branched region fluidly connected to a plurality of tubular secondary fluid channels, each having a second cross-sectional area; and
   a second branched region adjacent to each of the secondary fluid channels, each of the second branched regions fluidly connected to a plurality of tubular tertiary fluid channels, each having a third cross-sectional area;
   wherein the second cross-sectional area is greater than the third cross-sectional area;
   wherein the first cross-sectional area is defined by a first radius ($r_1$), the second cross-sectional area is defined by a second radius ($r_2$), and the third cross-sectional area is defined by a third radius ($r_3$); and
   wherein the relationship between the primary fluid channel and each of the secondary fluid channels follows the equation $r_1^x = \Sigma r_2^x$ where x falls within the range of 1.5 to 3.5, and wherein the relationship between each of the secondary fluid channels and each of the tertiary fluid channels follows the equation $r_2^x = \Sigma r_3^x$ where x falls within the range of 1.5 to 3.5.

2. The header of claim 1, wherein the secondary fluid channels and the tertiary fluid channels have one of a straight geometry and a helical geometry.

3. The header of claim 1, wherein the header has a fractal geometry.

4. The header of claim 1, wherein the first branched region is a bifurcation, such that the plurality of secondary fluid channels comprises a pair, and wherein the second branched region is a bifurcation, such that the plurality of tertiary fluid channels comprises a pair.

5. The header of claim 1, wherein the header is formed from a metallic or polymer material.

6. The header of claim 1 and further comprising: a third branched region adjacent to each of the tertiary fluid channels, each of the third branched regions fluidly connected to a plurality of tubular quaternary fluid channels, each having a fourth cross-sectional area.

7. The header of claim 6, wherein the fourth cross-sectional area is defined by a fourth radius ($r_4$), and wherein the relationship between each of the tertiary fluid channels and each of the quaternary fluid channels follows the equation $r_3^x = \Sigma r_4^x$ where x falls within the range of 1.5 to 3.5.

8. The header of claim 1, wherein for each of the equations $r_1^x = 1$ $r_2^x$ and $r_2^x = \Sigma r_3^x$, x=3.

9. A heat exchanger comprising:
   an inlet header configured to receive a first fluid, the inlet header comprising:
      a tubular primary fluid channel oriented along a first axis and having a first cross-sectional area;
      a first branched region downstream of and adjacent to the primary fluid channel, the first branched region fluidly connected to a plurality of tubular secondary fluid channels, each having a second cross-sectional area; and
      a second branched region downstream of and adjacent to each of the secondary fluid channels, each of the second branched regions fluidly connected to a plurality of tubular tertiary fluid channels, each having a third cross-sectional area;
   an outlet header in fluid communication with the inlet header, the outlet header comprising:
      a tubular primary fluid channel oriented along the first axis and having a first cross-sectional area;
      a first branched region upstream of and adjacent to the primary fluid channel, the first branched region fluidly connected to a plurality of tubular secondary fluid channels, each having a second cross-section area; and
      a second branched region upstream of and adjacent to each of the secondary fluid channels, each of the second branched regions fluidly connected to a plurality of tubular tertiary fluid channels, each having a third cross-sectional area;
   wherein each of the second cross-sectional areas are greater than each of the third cross-sectional areas;
   wherein the first cross-sectional areas are defined by a first radius ($r_1$), each of the second cross-sectional areas are defined by a second radius ($r_2$), and each of the third cross-sectional areas are defined by a third radius ($r_3$); and
   wherein the relationship between the inlet header and outlet header primary fluid channels and each of the inlet header and outlet header secondary fluid channels follows the equation $r_1^x = \Sigma r_2^x$ where x falls within the range of 1.5 to 3.5, and wherein the relationship between each of the inlet header and outlet header secondary fluid channels and each of the inlet header and outlet header tertiary fluid channels follows the equation $r_2^x = \Sigma r_3^x$ where x falls within the range of 1.5 to 3.5.

10. The heat exchanger of claim 9, wherein one of the inlet header secondary and tertiary fluid channels, and the outlet header secondary and tertiary fluid channels has a straight geometry.

11. The heat exchanger of claim 9, wherein one of the inlet header secondary and tertiary fluid channels, and the outlet header secondary and tertiary fluid channels has helical geometry.

12. The heat exchanger of claim 9, wherein the first branched region is a bifurcation, such that the plurality of secondary fluid channels comprises a pair, and wherein the second branched region is a bifurcation, such that the plurality of tertiary fluid channels comprises a pair.

13. The heat exchanger of claim 9 and further comprising: a core section disposed between and fluidly connecting the inlet header and the outlet header.

14. The heat exchanger of claim 9, wherein at least one of the inlet header and the outlet header has a fractal geometry.

15. The heat exchanger of claim 1 and further comprising:
   an inlet header third branched region adjacent to each of the inlet header tertiary fluid channels, each of the third branched regions being fluidly connected to a plurality of tubular quaternary fluid channels, each having a fourth cross-sectional area; and
   an outlet header third branched region adjacent to each of the outlet header tertiary fluid channels, each of the third branched regions being fluidly connected to a plurality of tubular quaternary fluid channels, each having a fourth cross-sectional area.

16. The heat exchanger of claim 1, wherein for each of the equations $r_1^x = \Sigma r_2^x$ and $r_2^x = \Sigma r_3^x$, x=3.

* * * * *